US 9,148,366 B2

(12) United States Patent
Burns

(10) Patent No.: US 9,148,366 B2
(45) Date of Patent: Sep. 29, 2015

(54) INTERACTIVE HEADER COMPRESSION IN PEER-TO-PEER COMMUNICATIONS

(75) Inventor: Gregory Burns, Seattle, WA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 106 days.

(21) Appl. No.: 13/084,403

(22) Filed: Apr. 11, 2011

(65) Prior Publication Data

US 2012/0257630 A1    Oct. 11, 2012

(51) Int. Cl.
H04L 12/721   (2013.01)
H04L 12/54    (2013.01)
H04L 12/801   (2013.01)

(52) U.S. Cl.
CPC ............... H04L 45/38 (2013.01); H04L 12/56 (2013.01); *H04L 47/10* (2013.01)

(58) Field of Classification Search
CPC ................................ H04L 45/38; H04L 12/56
See application file for complete search history.

(56) References Cited

U.S. PATENT DOCUMENTS

2004/0170175 A1*  9/2004  Frank et al. .................. 370/392
2007/0043824 A1*  2/2007  Fremantle .................... 709/214
2007/0153764 A1*  7/2007  Thubert et al. ............... 370/351
2008/0031269 A1*  2/2008  Shimizu et al. ............... 370/412
2008/0170574 A1*  7/2008  Schoppmeier ............. 370/395.1
2008/0243675 A1* 10/2008  Parsons et al. ................ 705/37
2009/0043900 A1*  2/2009  Barber .......................... 709/228
2009/0103722 A1*  4/2009  Anderson et al. ............. 380/44
2009/0185534 A1*  7/2009  Barber et al. ................. 370/330
2009/0235339 A1*  9/2009  Mennes et al. .................. 726/5
2009/0327510 A1* 12/2009  Edelman et al. ............. 709/231
2010/0057903 A1*  3/2010  Robinson ..................... 709/224
2010/0146128 A1*  6/2010  Kulkarni et al. ............. 709/228
2010/0329172 A1* 12/2010  Wu et al. ...................... 370/312
2011/0128975 A1*  6/2011  Kang et al. ................... 370/477
2012/0110152 A1*  5/2012  Wing et al. ................... 709/223
2012/0170571 A1*  7/2012  Antonelli et al. ............ 370/352

* cited by examiner

Primary Examiner — Alpus H Hsu
Assistant Examiner — Walter Divito
(74) Attorney, Agent, or Firm — Neugeboren O'Dowd PC

(57) ABSTRACT

Apparatus and methods for communicating messages between communication devices are disclosed. The method includes receiving, from a second communication device, a message with a compressed header and a compression token, the compression token replacing routing information compressed out of an original header of the message. The method also includes determining, using the compression token, whether the routing information is stored on a first communication device, and requesting, if the routing information is not stored on the first communication device, that the second communication device send the routing information to the first communication device. And the first communication device routes the message to a destination device based upon the routing information.

16 Claims, 5 Drawing Sheets

|  | Message Type 1 | Message Type 2 | ... | Message Type N |
|---|---|---|---|---|
| Sender | :1.2 | | | |
| Destination | "" | | | |
| Interface | org.alljoyn.games.seaking | | | |
| Object Path | g/alljoyn/games/seaking | | | |
| Member | Player Position | | | |
| Signature | "i.i" | | | |
| Token Value | 99 | | | |

FIG. 5

INTERACTIVE HEADER COMPRESSION IN PEER-TO-PEER COMMUNICATIONS

FIELD OF THE INVENTION

The present invention relates to communication devices. In particular, but not by way of limitation, the present invention relates to communication devices that intercommunicate in peer-to-peer networks.

BACKGROUND OF THE INVENTION

Communication devices such as smartphones, netbooks, gaming devices, PDAs, desktop computers, and laptop computers are now ubiquitous. And the capabilities of these communication devices have developed to a level that enables these communication devices to intercommunicate in a peer-to-peer manner.

For example, peer-to-peer communication is now used in connection with gaming (e.g., multi-player gaming), social networking (e.g., users may exchange messages), groupware applications (e.g., information may be synchronized and shared among ad-hoc groups without an external network), proximity based services (information may be broadcast to communication devices when within close proximity), and media entertainment (e.g., remote control and game control).

The protocols that are utilized to communicate data between communication devices typically include a relatively large message header that contains multiple human-readable strings. When transmitting a small payload, for example the XY coordinates of a player in a multiplayer game, the message header (rather than the payload) dictates the minimum size of the data packet. For any protocol, but especially wireless protocols (e.g., Bluetooth), the minimum data packet size can have a large impact on the performance of the network; thus a user's experience may be adversely affected by these message headers.

As a consequence, the existing peer-to-peer communication techniques are often less than desirable and will almost certainly be unsatisfactory in the future.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

In accordance with several embodiments, the invention may be characterized as a method for communicating a message from a second communication device to a first communication device. The method includes receiving, from the second communication device, a message with a compressed header and a compression token, the compression token replacing routing information compressed out of an original header of the message. In addition, the method includes determining, using the compression token, whether the routing information is stored on the first communication device and requesting, if the routing information is not stored on the first communication device, that the second communication device send the routing information to the first communication device. And then the method includes routing the message to a destination device based upon the routing information.

Another embodiment of the invention may be characterized as a communication device. The communication device includes a transceiver to receive a message from a sending-communication-device, the message including a compressed header and an expansion token. In addition, the communication device includes a memory to store expansion data and a messaging module in communication with the transceiver. The messaging module uses the expansion token to expand a header of the received message to obtain routing information if the expansion token and routing information is stored in the expansion data in the memory, and if the expansion token and routing information are not stored in the expansion data in the memory, the messaging module generates an expansion request that the transceiver sends to the sending-communication-device to request that the sending-communication device send the routing information.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

FIG. 5 depicts an exemplary table of compression data that may be utilized in connection with the embodiments described with reference to FIGS. 1-4.

DETAILED DESCRIPTION

In general, several embodiments of the invention provide header compression for unicast (point-to-point) and broadcast (point to multipoint) data packets to substantially improve network performance. In many variations, the operation between communication devices is interactive insofar as the receiver of the compressed header initiates a communication with the sender to obtain necessary information to expand the compressed header.

Figure 1:
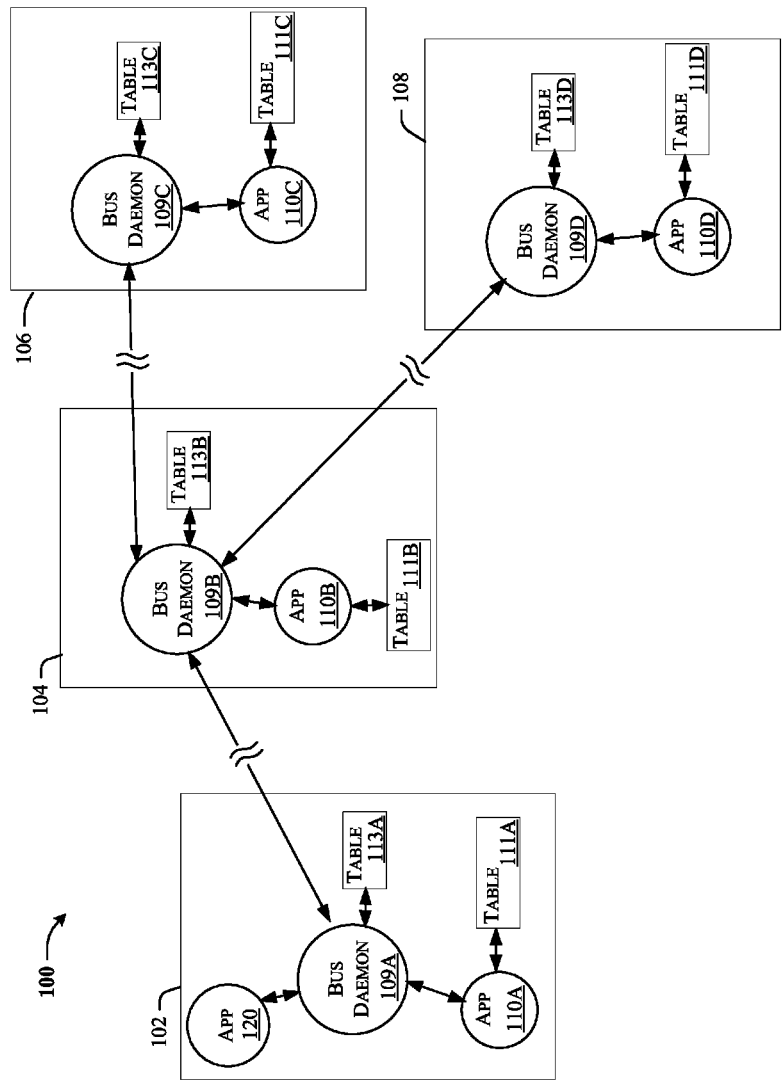
FIG. 1 is a block diagram depicting an environment in which exemplary embodiments of the present invention may be realized.

Referring first to FIG. 1, it is a block diagram depicting an environment 100 in which several embodiments of the present invention may be realized. As shown, each of a first communication device 102, a second communication device 104, a third communication device 106, and a fourth communication device 108 are in communication with other ones of the communication devices 102, 104, 106, 108. Although other architectures may be utilized in connection with the various embodiments of the present invention, in the environment 100 depicted in FIG. 1, each of the communication devices 102, 104, 106, 108 includes a messaging module, which may be implemented as one of the depicted bus daemons 109A, 109B, 109C, 109D that communicates with one of the bus daemons 109A, 109B, 109C, 109D on other ones of the communication devices 102, 104, 106, 108.

In addition, for exemplary purposes, each of the communication devices 102, 104, 106, 108 includes one or more applications 110A, 110B, 110C, 110D. And as shown, in communication with each of the bus daemons 109A, 109B, 109C, 109D is a corresponding bus expansion table (bus tables 113A, 113B, 113C, 113D) and in communication with each of the applications 110A, 110B, 110C, 110D, is a corresponding application expansion table (application tables 111A, 111B, 111C, 111D).

In general, the bus daemons 109A, 109B, 109C, 109D interoperate to effectively extend a bus across the communication devices 102, 104, 106, 108; thus creating a single logical bus, which enables any one of the applications 110A, 110B, 110C, 110D in the communication devices 102, 104, 106, 108 to communicate with any of the other applications 110A, 110B, 110C, 110D. Although several embodiments of the invention are described herein as utilizing bus daemons in the context of a software-bus type architecture, this is certainly not required, and in other embodiments the compression and interactive communication schemes may be utilized in connection with other message passing systems using different architectures.

The depicted applications 110A, 110B, 110C, 110D may be a variety of application types including gaming applications, audio applications, video applications, social networking applications, groupware applications, proximity based services, and media entertainment. And although not separately depicted in FIG. 1, the applications 110A, 110B, 110C, 110D may operate as clients and/or services. For example, a chat application may alternate between sending messages (as a service) and receiving messages (as a client).

In many implementations, the bus daemons 109A, 109B, 109C, 109D and applications 110A, 110B, 110C, 110D are capable of being deployed in connection with a variety of platforms. For example, but not by way of limitation, the bus daemons 109A, 109B, 109C, 109D and applications 110A, 110B, 110C, 110D may be deployed in connection with the Android platform, Ubuntu, Windows, Brew MP, WebOS, and Meego.

The transport between the communication devices 102, 104, 106, 108 may be any of a variety of technologies and protocols. For example, the communication devices 102, 104, 106, 108 may communicate by Bluetooth, WiFi, or any other transport.

Although the communication devices 102, 104, 106, 108 may be realized by a variety of disparate hardware components and platforms, as discussed above, the inter-daemon communication effectively extends the logical bus across the communication devices 102, 104, 106, 108 creating a single logical bus with an arbitrary network topology. For example, the network topologies may include client-server (e.g., GPS service), simple peer-to-peer (e.g., 2-way chat), and complex peer-to-peer (e.g., multi-player games) topologies.

In many modes of operation, the communication devices 102, 104, 106, 108 intercommunicate repeatedly with messages that have the same or similar headers. If each of the communication devices 102, 104, 106, 108 is participating in a game application for example, each of the communication devices 102, 104, 106, 108 may repeatedly send messages with the same message header, and the payload may simply be player position information, which is communicated as an XY coordinate.

Although the payload of each message is very small in this example, the message header may be large enough to dictate that multiple data packets are required instead of a single data packet, which increases latency and power consumption. For example, a Bluetooth radio may transmit up to 83 bytes in a single slot baseband packet, but 84 bytes requires that a three slot baseband packet be utilized taking three times as long to transmit as 83 bytes. And the header information (e.g., ASCII strings) is frequently 200 bytes or more.

As a consequence, according to several embodiments of the present invention, if it is advantageous to do so, each of the applications 110A, 110B, 110C, 110D compresses the message headers of the messages that they send by replacing the message header of each message with a compression token. And the message header, along with the compression token, is stored in the expansion table (e.g., the corresponding application table 111A, 111B, 111C, 111D) that is associated with the corresponding application. In this way, the number of bytes associated with each message is substantially reduced, and hence, the performance of the intercommunication between the communication devices 102, 104, 106, 108 is improved.

In contrast to typical IP header compression, the communication devices 102, 104, 106, and 108 in the depicted embodiment each operate to handle expansion of a header upon receipt. In addition, in many modes of operation (although not all), embodiments of the communication devices 102, 104, 106, 108 enable headers of multi-cast packets to be compressed, which typical compression schemes are unable to do. In particular, in the context of multi-cast transmission, the sending devices do not know which device is going to receive the packets.

As consequence, in many modes of operation, the expansion (also referred to herein as decompression) takes place on a hop-by-hop basis. In operation for example, before the first application 110A in the first communication device 102 sends a message to other communication devices 104, 106, 108, the first application 110A compresses the header and sends a token to a first bus daemon 109A. In many embodiments for example, the first application 110A stores (in the expansion table 111A) a compression token along with the extracted header information that would ordinarily be sent to one or more of the applications 110A, 110B, 110C, 110D. And instead of sending the header information, the first application 110A sends the message with the token in place of the stored header information.

Referring briefly to FIG. 5, for example, shown is an exemplary expansion table 500 that may be used to realize the expansion tables 111A, 111B, 111C, 111D depicted in FIG. 1. As shown, header information 502 in the exemplary table includes routing information 504, which is generally information that enables the message to be sent to a desired location (e.g., a desired application). In the exemplary table, the routing information includes destination information, interface information and an object path. But it is certainly contemplated that the particular header fields and formatting may vary from protocol to protocol. In addition, the table in this embodiment includes sender information, member information, signature information, and a token value 506.

As shown, each of the columns depicted in the table correspond to a message type that is repeatedly sent. As shown, but merely as an example, is a Message-Type 1-column that includes data corresponding to a message that conveys a player position (e.g., of a player on the first communication device 102) to other communication devices 104, 106, 108. In this example, the destination field includes empty quotation marks (" ") as opposed to a specific device, and as a consequence, the message in Message Type 1 is a multi-cast type message, which is sent to all devices (e.g., devices other than the first communication device 102). Alternatively the destination field might name a multi-cast group to which destination devices may belong, in which case the multi-cast message is sent to all devices that belong to that multi-cast group.

In many implementations, the token value 506 is a randomly generated number, but the token may be generated in a variety of other ways (e.g., the token value may be a cryptographic hash of the replaced header information 502).

Referring again to FIG. 1, when the first bus daemon 109A receives a compressed message, the first bus daemon 109A does not know how to route the message while it is compressed because the information for routing the message (e.g., the routing information 504) is not present in the message. So, the first bus daemon 109A checks the first bus table 113A to determine whether the first bus table 113A includes the token sent with the received message.

If the first bus table 113A does not include the token, the first bus daemon 109A sends a request message (e.g., remote procedure call, inter-process call, or other type of communication) to the first application 110A, and requests how to decompress the message associated with the received token value. The first application 110A then responds by sending an expansion rule (e.g., the header information 502 in the column of the table associated with the token).

And once the first bus daemon 109A has received the expansion rule (e.g., the routing information 504 and any other information compressed out of the header), the first bus daemon 109A builds a version of the expansion rule in its compression table (the first compression table 113A). In other words, the expansion rule in the application table 111A is duplicated in the bus table 113A.

Once the first bus daemon 109A has received the expansion rule, the first bus daemon 109A may expand the header for the purpose of determining how to route the message. For example, the first bus daemon 109A retrieves routing information from the header information that is now stored in the bus table 113A. The first bus daemon 109A then sends the compressed version of the message (e.g., the same compressed message that was sent by the first application 110A).

And when a second bus daemon 109B of the second communication device 104 receives the compressed message (including a token value that the second bus daemon 109B has not seen before), the second bus daemon 109B does not know how to route the message (because it does not have routing information and has not seen the compression token before). As a consequence, the second bus daemon 109B sends an expansion request (one hop back) to the first bus daemon 109A of the first communication device 102, and the first bus daemon 109A of the first communication device 102 sends the expansion rule from the first bus table 113A to the second bus daemon 109B of the second communication device 104.

And once the second bus daemon 109B receives the expansion rule, the second bus daemon 109B updates the second bus table 113B with the expansion rule so that the second bus table 113B has the same expansion rule for the token as both the first bus table 113A and the first application table 111A. Then, the second communication device 104 sends the message to the third bus daemon 109C of the third communication device 106 and to the fourth bus daemon 109D of the fourth communication device 108, and each of the third and fourth bus daemons 109C, 109D obtain the expansion rule for the token from the second communication device 104 and then build up their expansion tables 113C, 113D to include the expansion rule (e.g., the header information removed from the message).

When the first application 110A sends a message with the same compression token a second time, the first bus daemon 109A in the first communication device 102 will retrieve the expansion rule from the first bus table 113A and will send the message as a broadcast message, and likewise, the second, third and fourth communication devices 104, 106, 108 will also send the message as a broadcast message using the expansion rule stored in their corresponding second, third, and fourth bus tables 113B, 113C, 113D.

Thus, expansion rules for messages are propagated a hop at a time on an as-needed basis. More specifically, and when a bus daemon experiences a token that the bus daemon has not seen before, that bus daemon is able to determine which device sent the message (i.e., the immediate sender), and as a consequence, the receiving bus daemon is able to send an expansion request to the immediate sender. For example, when a bus daemon receives a packet via a particular transport, the bus daemon knows where the message came from so the bus daemon can send back a request from the immediate sender. As examples, if the message arrived over Bluetooth from a particular Bluetooth device or arrived over a TCP/IP connection from an IP address, the receiving communication device can send an expansion request back to the sending Bluetooth device or to the sending IP address. But in embodiments where the sender information is compressed out of the header, the receiving bus daemon will not know whether a compressed message originated from a device prior to the immediate sender sending the message.

Although all routing information may be compressed out of a header, this is certainly not required. And in addition, other header fields may remain uncompressed. For example, some information in an original header may change from message to message. It may be desirable, by way of further example, to leave a "time stamp" field and a "time to live" field in a message header so that receiving devices may immediately determine whether the message is still useful.

Although applications in many implementations send compressed header messages to a corresponding daemon bus, this is certainly not required in all instances. For example, the application 120 in the first communication device 102 may send and receive uncompressed messages, which the first bus daemon 109A compresses and decompresses. But if a message has been secured using end-to-end encryption, the application then needs to compress and decompress the header information.

Figure 2:
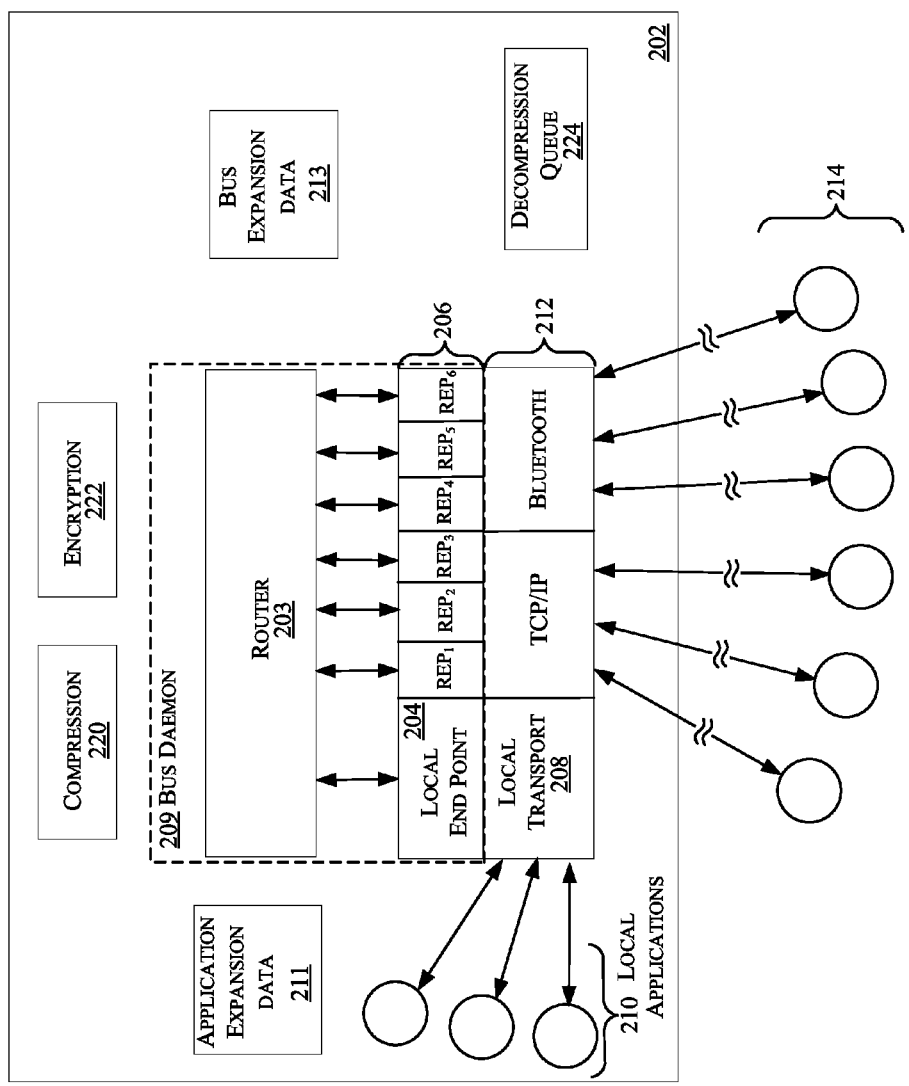
FIG. 2 is a block diagram depicting an exemplary embodiment of a communication device.

Referring next to FIG. 2, shown is a communication device 202, which may be used to realize any one of the communication devices 102, 104, 106, 108 described with reference to FIG. 1. As shown, in this embodiment, a bus daemon 209 includes a router 203 that is in communication with a local end point 204 and a collection of remote end points (REPs) 206. And in addition, the bus daemon 209 includes a local transport component 208 (e.g., Unix-based transport), and the local transport component 208 is in communication with the local endpoint 204 and local applications 210. In addition, remote transport components 212 (e.g., TCP/IP and Bluetooth transport components) of the bus daemon 209 are coupled to remote applications 214. Also shown are a bus expansion data 213 that includes expansion rules that are utilized by the bus daemon 209 and an application-expansion-data component 211 that includes expansion rules utilized by the local applications 210.

The depiction of these components is logical and is not intended to be an actual hardware diagram, and as discussed further herein, each component may be further separated into constituent components, but it should also be recognized that the components may be integrated to such an extent that each component may not be separately recognizable in actual implementation. For example, the application-expansion data component 211 and bus expansion data 213 are depicted as two separate constructs, but the expansion rules may be organized in a variety of ways (e.g., one datastore or separate datastores). Moreover, the depicted components may be realized by hardware, software, firmware, or a combination thereof.

As shown, the local applications 210 communicate with the bus daemon 209 by way of the local transport component 208 (e.g., a Unix transport component), and the local end point 204 links communications between the router 203 and the local transport component 208. Similarly, the remote applications 214 communicate with the bus daemon 209 by way of the remote transport components (e.g., TCP/IP and Bluetooth transports) 212, and the remote endpoints 206 link the remote transport components 212 to the router 203. Thus, a message originating from one of the local applications 210 follows a path including the local transport component 208, the local end point 204, the router 203, one of the remote end points 206, and one of the remote transport components 212.

With respect to the endpoints 204, 206, each of the endpoints 204, 206 represents a corresponding communication device (e.g., one of the communication devices 102, 104, 106, 108) in the network. From the perspective of the router 203, the local endpoint 204 represents the communication device 202 where the local applications 210 reside, and the local endpoint 204 may be a local socket layer. And the remote endpoints 206 represent remote devices where the remote applications 214 reside. In the context of the remote endpoints 206, for example, a Bluetooth endpoint may be characterized by a Bluetooth device address and a TCP/IP endpoint may be characterized by an IP address.

In the exemplary embodiment, the bus expansion data 213 includes compression/expansion data that is associated with each endpoint 204, 206. For example, the compression/expansion data may be organized so that the data may be indexed either associatively by the contents of the message (to determine the token) or the data may be accessed with the token to obtain expansion rules.

The router 203 generally operates to route messages to the appropriate endpoint based upon the routing data of each message. And in response, the router 203 handles messages that include destination information in the header (e.g., the messages are uncompressed), and the selected endpoint performs compression of the message header utilizing the compression component 220. For example, the compression component 220 may be a library called by one of the endpoints 204, 206 to carry out the compression of the header.

In operation, in the context of messages being sent from the local applications 210 to the remote applications 214, each of the local applications 210 may compress header information and store the removed header information along with a compression token in the application expansion data. Again, in some instances the local applications 210 do not compress messages. For example, when it is anticipated that the message will be sent infrequently, compression may actually slow the overall propagation of messages. And in addition, in some variations, the messages sent between one or more of the local applications 210 are not compressed.

When one of the local applications 210 generates a compressed message, and if the local endpoint 204 can not expand the message (e.g., because no token exists in the bus expansion data 213 that corresponds to the token in the message), the local endpoint 204 sends an expansion request message back to the local application 210 requesting that the local application 210 send the expansion rule (e.g., the data compressed out of the message). But if the local endpoint 204 can decompress the message, the header is expanded, and passed to the router 203 in a decompressed form so that the router 203 can "see" the routing information and then forward the message (after compression by one of the remote endpoints 206) based upon the destination address.

When a compressed message arrives at the communication device 202 from one of the remote applications 214, one of the remote endpoints 206 (corresponding to the communication device that sent the message) accesses the bus expansion data 213 using the token in the compressed message, and the message destination information in the compressed message is obtained and used to send the message to the destination (e.g., to one of the local applications 210 and/or one or more remote application(s) 214. If the remote endpoint 206 cannot find the token in the bus expansion data 213, the remote endpoint 206 sends an expansion request back to the communication device that sent the message.

Also shown is a decompression queue 224 that includes a list of compressed messages that have been received, but cannot be expanded because the tokens in the messages are not in the bus expansion data 213. Thus the messages queued in the decompression queue 224 are messages that are pending decompression, and when the expansion rule arrives from a sending communication device, the messages are expanded and removed from the decompression table 224

Figure 3:
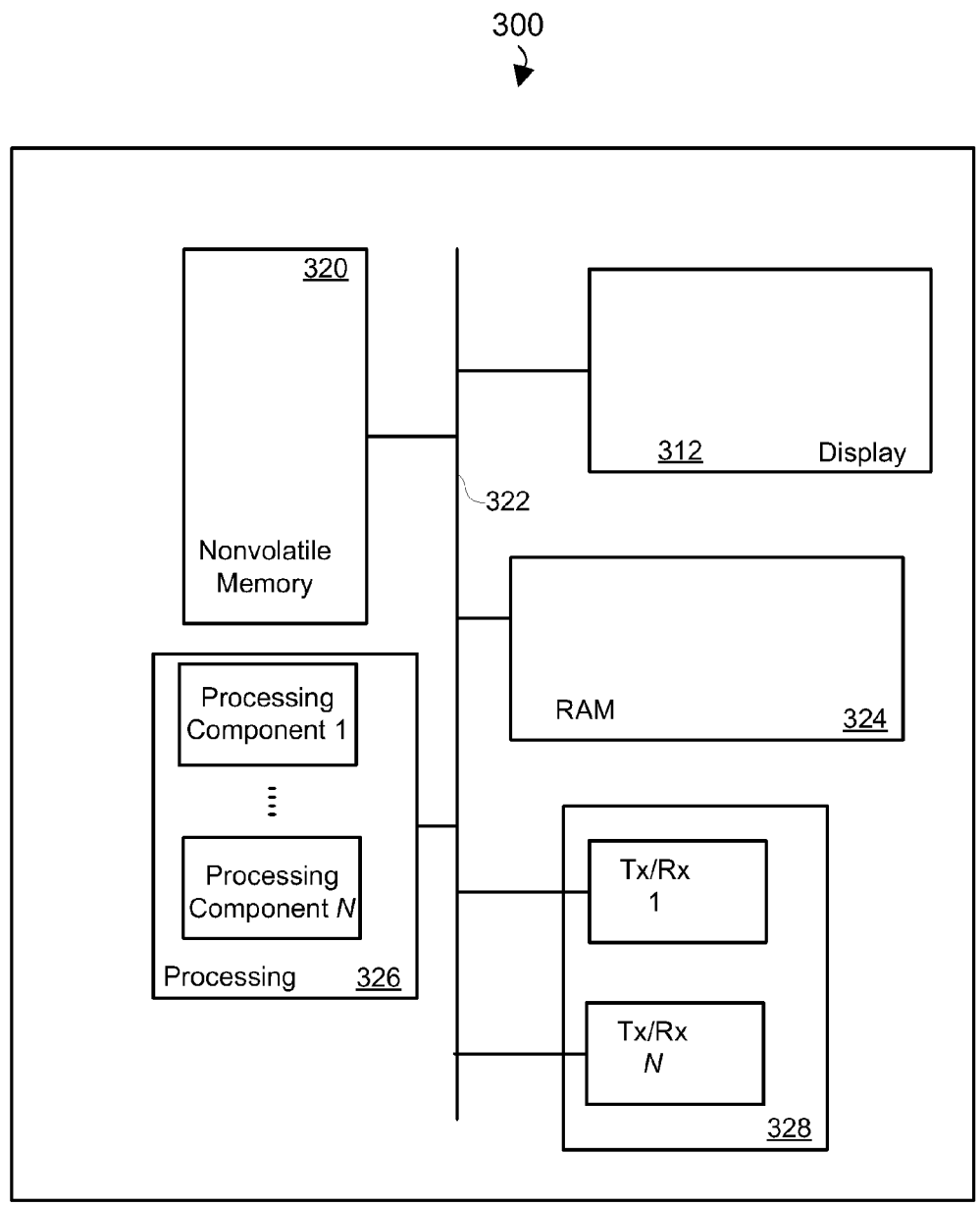
FIG. 3 is a block diagram depicting physical components that may be used to realize the functional components depicted in FIGS. 1 and 2.

Referring next to FIG. 3, shown is a block diagram depicting physical components of an exemplary communication device 300 that may be utilized to realize the communication devices 102, 104, 106, 108 described with reference to FIG. 1 and the communication device 202 described with reference to FIG. 2. As shown, the communication device 300 in this embodiment includes a display 312, and nonvolatile memory 320 that are coupled to a bus 322 that is also coupled to random access memory ("RAM") 324, a processing portion (which includes N processing components) 326, and a transceiver component 328 that includes N transceivers. Although the components depicted in FIG. 3 represent physical components, FIG. 3 is not intended to be a hardware diagram; thus many of the components depicted in FIG. 3 may be realized by common constructs or distributed among additional physical components. Moreover, it is certainly contemplated that other existing and yet-to-be developed physical components and architectures may be utilized to implement the functional components described with reference to FIG. 3.

This display 312 generally operates to provide a presentation of content to a user, and in several implementations, the display is realized by any of a variety of displays (e.g., LCD or OLED displays).

In general, the nonvolatile memory 320 functions to store (e.g., persistently store) data and executable code including code that is associated with the functional components depicted in FIGS. 1 and 2. In some embodiments for example, the nonvolatile memory 320 includes bootloader code, modem software, operating system code, file system code, and code to facilitate the implementation of one or more portions of the bus daemons 109A, 109C, 109D, 109E, 209 and applications 110A, 110B, 110C, 110D, 210 discussed in connection with FIGS. 1 and 2 as well as other functional components depicted in FIG. 2. In addition, the compression/expansion data discussed herein may be stored in RAM 324 or the nonvolatile memory 320.

In many implementations, the nonvolatile memory 320 is realized by flash memory (e.g., NAND or ONENAND™ memory), but it is certainly contemplated that other memory types may be utilized as well. Although it may be possible to execute the code from the nonvolatile memory 320, the executable code in the nonvolatile memory 320 is typically loaded into RAM 324 and executed by one or more of the N processing components in the processing portion 326.

The N processing components 326 in connection with RAM 324 generally operate to execute the instructions stored in nonvolatile memory 320 to effectuate the functional components depicted in FIGS. 1 and 2. As one of ordinarily skill in the art will appreciate, the processing components 326 may include a video processor, modem processor, DSP, graphics processing unit (GPU), and other processing components.

The depicted transceiver component 328 includes N transceiver chains, which may be used for communicating with external devices via wireless networks. Each of the N transceiver chains may represent a transceiver associated with a particular communication scheme, and these may be utilized in connection with the remote transport components 212 to communicate with remote communication devices (e.g., via Bluetooth or WiFi).

Figure 4:
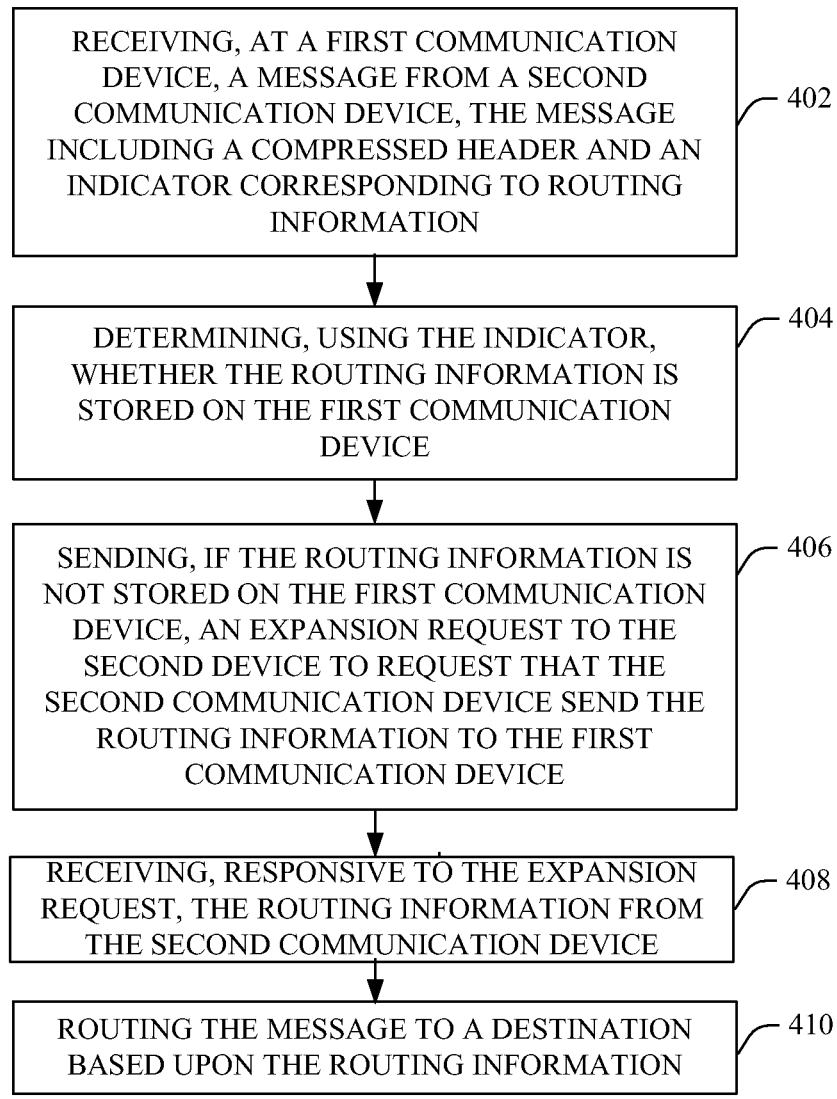
FIG. 4 is a flowchart that depicts a method that may be carried out in connection with the embodiments described with reference to FIGS. 1-3.

Referring next to FIG. 4, it is a flowchart depicting steps of a method that may be traversed in connection with the embodiments described with reference to FIGS. 1-3. As shown, a first communication device (e.g., the first communication device 102) receives a message from a second communication device (e.g., the second communication device 104) that includes a compressed header and an indicator corresponding to routing information (Block 402). For example, the indicator that corresponds to routing information may be a token value (e.g., the token value 506) and the routing information may include a destination of the message, and in some implementations, the routing information may include the routing information 504 described with reference to FIG. 5 (e.g., a destination, interface, and object path).

After receiving the message from the second communication device, the first communication device determines, using the indicator (e.g., the token value) whether the routing information is stored on the first communication device (Block 404). In connection with the embodiment described with reference to FIG. 2 for example, one of the remote endpoints 206 accesses the bus compression data 213 to determine whether routing information is stored on the communication device 202 in connection with the indicator.

As depicted, if the routing information for the received message is not stored on the first communication device, an expansion request is sent to the second communication device to request that the second communication device send the routing information to the first communication device (Block 406), and in response to sending the expansion request, the first communication device receives the routing information from the second communication device (Block 408). For example, while the first communication device waits for the second communication device to send the routing information, the message may be queued in the decompression queue 224, and the second communication device retrieves the routing information corresponding to the indicator and sends the routing information to the first communication device.

When the first communication device has the routing information corresponding to the indicator, the first communication device sends the message to the destination based upon the routing information (Block 410). As previously discussed, the destination may indicate that the first communication device is to multicast the message to other communication devices, or the destination may indicate a specific device. And the first communication device will operate in the same manner as the second communication device above in Blocks 402-408 to provide the routing information in response to expansion requests from receiving-communication-devices that do not have the routing information.

In conclusion, embodiments of the present invention provide header compression for unicast (point-to-point) and broadcast (point to multipoint) data packets to substantially improve network performance. In many variations, the operation between communication devices is on a hop-by-hop basis insofar as each receiver of the compressed header initiates a communication with the immediate sender to obtain necessary information to expand the compressed header. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A communication system comprising:
   a plurality of communication devices, each of the communication devices includes:
   a transceiver to receive a multicast message from a remote application on an originating one of the communication devices, the multicast message including a payload, sender information, and a token, wherein the token replaces destination information and identifying information previously removed from an uncompressed header at the originating one of the communication devices and not the payload, and the payload is smaller in size than the uncompressed header, and the sender information, the token, and the payload together can be received using a same number of data packets as a number of packets required to receive the payload alone;
   memory that includes a table to store and relate expansion data to the token,
      wherein the expansion data:
         corresponds to the token,
         comprises bus expansion data or application expansion data, and
         contains destination information; and
      wherein the table further stores and relates each of a plurality of tokens to a corresponding one of a plurality of other expansion data sets,
   a messaging module in communication with the transceiver, the messaging module uses the token of the received multicast message to obtain the expansion data if the token has previously been stored in the table in the memory, and if the token has not been previously stored in the table in the memory, the messaging module generates an expansion request that the transceiver sends to the originating one of the communication devices to request that the originating one of the communication devices send the expansion data, thereby allowing the expansion data to be propagated on a hop-by-hop basis and the multicast message to be multicast with the token to any of the communication devices that have received the expansion data;
   a compression component, the compression component removes the destination information to generate an outgoing multicast message with new sender information, the payload, and the token; and
   wherein the messaging module is configured to multicast the outgoing multicast message with new sender information, the payload and the token.

2. The communication system of claim 1, wherein the token is a hash function of the destination information.

3. The communication system of claim 1, wherein the token is a random number.

4. The communication system of claim 1, wherein each of the communication devices includes a decompression queue that includes a list of compressed messages that have been received but cannot be expanded because tokens in the messages are not stored in the table.

5. A method for communicating a message from a first communication device to a plurality of other communication devices, the method comprising:
   multicasting the message from the first communication device, the multicast message including a payload, sender information, and a token, wherein the token replaces destination information and identifying information previously removed from an uncompressed header at the first communication device but does not replace the payload, wherein the payload is smaller in size than an uncompressed size of the header;
   receiving the multicast message with the payload, the sender information, and the token, wherein the sender information, token, and payload together can be received using a same number of data packets as a number of packets required to receive the payload alone at a second communication device:
   determining, using the token, whether a table in a memory on the second communication device already contains the token and expansion data;
      wherein the expansion data:
         corresponds to the token,
         comprises bus expansion data or application expansion data, and
         contains destination information;
      and wherein the table stores and relates each of a plurality of previously received tokens a corresponding one of a plurality of other expansion data sets,
   sending, if the token and the expansion data is not stored on the second communication device, a request from the second communication device to the first communication device that the first communication device send the expansion data to the second communication device;
   multicasting, without identifying a specific receiving device, the multicast message from the second communication device with new sender information from the second communication device, the same payload, and the same token;
   receiving the multicast message at a third communication device;
   sending, if the expansion data is not stored on the third communication device, a request from the third communication device to the second communication device that the second communication device send the expansion data to the third communication device; and
   multicasting the multicast message from the third communication device with new sender information from the third communication device, the same payload, and the same token, thereby allowing the expansion data to be propagated on a hop-by-hop basis as needed.

6. The method of claim 5, wherein the payload is player position information associated with a game that is executed by the plurality of communication devices.

7. The method of claim 5, including:
   encrypting the message on the first communication device to generate an encrypted message.

8. The method of claim 5, including:
   adding, before multicasting the message from the first communication device, a time indicator to the token of the message so that a receiving device does not have to have the expansion data of the message to determine an age of the message.

9. The method of claim 5, wherein the first, second, and third communication devices repeatedly send the same token and only the payload changes.

10. A communication system comprising:
   a plurality of communication devices, each of the communication devices includes:
      means for receiving, from a remote application on an originating one of the communication devices, a multicast message with sender information, a payload, and a token, the token replacing destination information compressed out of the uncompressed version of the header of the message, wherein the token does not replace the payload, the payload is smaller in size than an uncompressed size of the header, and the sender information, token, and payload together can be received using a same number of data packets as a number of packets required to receive the payload alone;
      memory that includes a table to store and relate each of a plurality of previously received tokens to a corresponding one of a plurality of other expansion data sets,
         wherein the expansion data:
            corresponds to the token,
            comprises bus expansion data or application expansion data, and
            contains destination information;
      means for requesting, if the token and the expansion data has not already been received and stored in the memory, that the originating one of the communication devices send the expansion data;
      means for generating an outgoing multicast message that includes the payload and the token but does not include the expansion data; and
      means for multicasting the multicast message, thereby allowing the expansion data to be propagated on a hop-by-hop basis.

11. The communication system of claim 10, wherein each of the communication devices includes means for executing a gaming application, wherein the payload includes coordinates of a player position utilized by the gaming application.

12. The communication system of claim 10, wherein each of the communication devices includes means for encrypting the message on the first communication device to generate an encrypted message.

13. The communication system of claim 10, including:
   means for adding, before multicasting the message, a time indicator to the token of the message so that a receiving device does not have to have the expansion data of the message to determine an age of the message.

14. The communication system of claim 10, wherein each of the communication devices includes means for generating a decompression queue that includes a list of compressed messages that have been received but cannot be expanded.

15. A non-transitory, tangible computer readable storage medium, encoded with processor readable instructions to perform a method for communicating between a plurality of communication devices, the method comprising:
   receiving, at a first communication device from a remote application on an originating communication device, a multicast message with sender information a payload, and a token, the token replacing destination information compressed out of an original header of the message, wherein the token does not replace the payload, the payload is smaller in size than an original uncompressed size of the header, and the sender information, token, and payload together can be received using a same number of data packets as a number of packets required to receive the payload alone;
   determining, using the token, whether expansion data is stored in a table in a memory on the first communication device, wherein the expansion data:
    corresponds to the token;
    comprises bus expansion data or application expansion data, and
    contains destination information; and
wherein the table stores and relates each of a plurality of previously received tokens to a corresponding one of a plurality of other expansion data sets;
requesting, if the expansion data is not stored on the first communication device, that the originating communication device send the expansion data to the first communication device;
storing the token and the expansion data in the memory of the first communication device so that if a second multicast message is received from the originating communication device with the token, the expansion data may be retrieved from the memory without requesting the expansion data from the originating communication device;

generating an outgoing multicast message that includes the payload and the token but does not include the expansion data;
adding, before multicasting the message, a time indicator to a header of the message so that a receiving device does not have to expand the header of the message to determine an age of the message;
multicasting the outgoing multicast message, thereby allowing the expansion data to be propagated on a hop-by-hop basis as needed, and;
sending the destination information to the receiving device responsive to a receipt of a request from the receiving device for the expansion data.

16. The non-transitory, tangible computer readable storage medium of claim 15, wherein the payload is player position information associated with a game that is executed by the plurality of communication devices.

* * * * *